US011833480B2

(12) United States Patent
Maeta et al.

(10) Patent No.: US 11,833,480 B2
(45) Date of Patent: Dec. 5, 2023

(54) SLURRY STORAGE AND STIRRING DEVICE AND SLURRY STIRRING METHOD

(71) Applicant: Proterial, LTD., Tokyo (JP)

(72) Inventors: Akihiro Maeta, Tottori (JP); Kazunori Nishimura, Minato-ku (JP)

(73) Assignee: PROTERIAL, LTD., Tokyo (JP)

( * ) Notice: Subject to any disclaimer, the term of this patent is extended or adjusted under 35 U.S.C. 154(b) by 611 days.

(21) Appl. No.: 16/979,724

(22) PCT Filed: Mar. 8, 2019

(86) PCT No.: PCT/JP2019/009330
§ 371 (c)(1),
(2) Date: Sep. 10, 2020

(87) PCT Pub. No.: WO2019/176768
PCT Pub. Date: Sep. 19, 2019

(65) Prior Publication Data

US 2021/0039058 A1 Feb. 11, 2021

(30) Foreign Application Priority Data

Mar. 15, 2018 (JP) ................................ 2018-048013

(51) Int. Cl.
*B01F 25/50* (2022.01)
*B01F 25/21* (2022.01)
(Continued)

(52) U.S. Cl.
CPC .............. *B01F 25/21* (2022.01); *B01F 25/50* (2022.01); *B01F 23/023* (2022.01); *B01F 23/53* (2022.01); *B01F 23/56* (2022.01)

(58) Field of Classification Search
CPC ....................................................... B01F 25/50
(Continued)

(56) References Cited

U.S. PATENT DOCUMENTS 626,950 A * 6/1899 Wheelwright ........ B01F 25/821
366/136
3,846,079 A * 11/1974 Alagy .................. B01J 19/2405
261/36.1

(Continued)

FOREIGN PATENT DOCUMENTS

CN 205995293 U 3/2017
JP 59-225729 A 12/1984

(Continued)

OTHER PUBLICATIONS

International Preliminary Report on Patentability with the translation of Written Opinion dated Sep. 24, 2020 from the International Bureau in International Application No. PCT/JP2019/009330.

(Continued)

*Primary Examiner* — David L Sorkin
(74) *Attorney, Agent, or Firm* — Sughrue Mion, PLLC

(57) ABSTRACT

A device includes a container for storing slurry, a main pipeline with one end connected to the container and the other end extending to an inner space of the container and forming a first circulation path, a nozzle attached to the other end of the main pipeline, a pump provided in the first circulation path between one end and the other end of the main pipeline for sucking and pressurizing slurry, a sub-pipeline which branches from the pump or branches from the main pipeline between the pump and the nozzle and extends to the inner space of the container and forms a second circulation path, a valve for switching distribution of slurry to one or both of the first and second circulation paths, and a discharge port provided at a tip opposite to a branch end of the sub-pipeline and located below the nozzle in a vertical direction.

14 Claims, 5 Drawing Sheets

(51) Int. Cl.
*B01F 23/00* (2022.01)
*B01F 23/53* (2022.01)
*B01F 23/50* (2022.01)

(58) Field of Classification Search
USPC .................................................. 366/136, 137
See application file for complete search history.

(56) References Cited

U.S. PATENT DOCUMENTS

| | | | | |
|---|---|---|---|---|
| 4,045,004 | A * | 8/1977 | Berger | B01F 35/713 366/175.2 |
| 4,621,928 | A | 11/1986 | Schreiber | |
| 6,065,860 | A * | 5/2000 | Fuchsbichler | B01F 21/20 366/136 |
| 6,132,078 | A * | 10/2000 | Lin | B24B 37/04 366/144 |
| 6,306,020 | B1 * | 10/2001 | Hed | B01F 25/50 451/60 |
| 9,682,494 | B2 * | 6/2017 | Arbour | B01F 25/64 |
| 2008/0074944 | A1 | 3/2008 | Blechschmitt et al. | |
| 2020/0115614 | A1 * | 4/2020 | Alsahlawi | C09K 23/00 |

FOREIGN PATENT DOCUMENTS

| | | | |
|---|---|---|---|
| JP | 61-204028 | A | 9/1986 |
| JP | 63-126533 | A | 5/1988 |
| JP | 2002-177809 | A | 6/2002 |
| JP | 2003-144882 | A | 5/2003 |
| JP | 2008-218515 | A | 9/2008 |
| JP | 2014-144926 | A | 8/2014 |
| WO | 2008/034783 | A1 | 3/2008 |
| WO | 2010/135365 | A2 | 11/2010 |

OTHER PUBLICATIONS

Japanese Office Action for JPA No. 2019-540105 dated Oct. 7, 2019.
International Search Report for PCT/JP2019/009330 dated Jun. 11, 2019 (PCT/ISA/210).
Communication dated Jan. 20, 2022 from the China National Intellectual Property Administration in Chinese Application No. 201980017005.6.

* cited by examiner

SLURRY STORAGE AND STIRRING DEVICE AND SLURRY STIRRING METHOD

CROSS REFERENCE TO RELATED APPLICATIONS

This application is a National Stage of International Application No. PCT/JP2019/009330 filed Mar. 8, 2019, claiming priority based on Japanese Patent Application No. 2018-048013, filed Mar. 15, 2018.

TECHNICAL FIELD

The present invention relates to a slurry storage and stirring device which stores a slurry while stirring the slurry and a slurry stirring method.

BACKGROUND ART

As one of the intermediate stages of a manufacturing process in various fields, a slurry obtained by mixing a powder and a solvent is well known. For example, when a magnetic powder which is a raw material of a magnetic core or a magnet is dry-formed or wet-formed, in the wet-forming, a slurry obtained by mixing a magnetic powder and a solvent such as oil is used, and in the dry-forming, a slurry obtained by mixing a magnetic powder and a solvent such as water is used.

In a ball mill which is generally used for mixing a powder and a solvent, if mixing is performed for a long time to obtain a uniform slurry, there is a problem that a mixing media such as alumina balls, zirconia balls, or iron balls causes contamination of the slurry due to abrasion. When a specific gravity of particles is several times or more larger than a specific gravity of a solvent, there is a problem that when mixing is stopped, the particles in a slurry precipitate in a container and are likely to separate into a particle phase and a solvent phase.

Against such a problem, Patent Document 1 describes that a slurry containing particles of a ceramic powder stored in a container is circulated by a pump, and injected from an upper nozzle to a liquid surface of the slurry in a circulation path to provide a mixing method with less contamination of impurities.

Patent Document 2 describes that a powder of metal, ceramics, or the like and a liquid which does not substantially dissolve the powder are mixed by a jet mixer. Patent Document 3 and Patent Document 4 describe a jet mixer used for stirring and mixing.

Patent Document 5 describes that in wet molding with magnet, a slurry is stored while being stirred in a container of a stirring device until the slurry is supplied to a molding machine, to suppress separation into magnetic particles and a solvent, and thus to supply the slurry with high dispersibility to the molding machine side. FIG. 6 shows an example of a configuration of a slurry stirring device. A stirring device 110 has an anchor-shaped rotary blade 134 at a center of a container 130 for storing a slurry and causes the rotary blade 134 to rotate to stir the slurry.

PRIOR ART DOCUMENTS

Patent Documents

Patent Document 1: JP-A-59-225729
Patent Document 2: JP-A-63-126533
Patent Document 3: WO 2010/135365 A
Patent Document 4: WO 2008/034783 A
Patent Document 5: JP-A-2008-218515

SUMMARY OF THE INVENTION

Problems to be Solved by the Invention

However, the method of Patent Document 1 has a problem that air is likely to be entrained in the slurry during mixing. When a jet mixer is used as in Patent Documents 2 to 4, there is also a problem that air is likely to be entrained in the slurry. That is, when a binder such as PVA (polyvinyl alcohol) or PVB (polyvinyl butyral) is contained, the air-entrained slurry is foamy, and when the slurry is sprayed and dried, it tends to give granules having a low bulk density. Molded articles obtained by dry molding using such granules tend to have low density and weak strength.

In the method of Patent Document 5, flow of the slurry in the container is dominant in a rotation direction of the rotary blade for stirring the slurry, and vertical flow in the container is small, so that particles having a larger specific gravity are more likely to be deposited on a lower portion of the container. Moreover, fine particles are likely to float on a liquid surface, and further improvement is required to obtain a uniform slurry. When injection of the slurry or the rotary blades stop, separation into a powder and a solvent becomes more remarkable, and therefore a countermeasure for the problem has been required.

An object of the present invention is to provide a slurry storage and stirring device capable of sufficiently flowing a slurry by a simple means even if an amount of the slurry in a slurry storage container varies, having excellent stirring properties, and capable of suppressing foaming, and a slurry stirring method.

Means for Solving the Problems

The present invention relates to, in one embodiment, a slurry storage and stirring device including a container capable of storing a slurry containing particles and a solvent, a main pipeline whose one end is connected to the container and the other end extends to an inner space of the container and that forms a first circulation path of the slurry, a nozzle attached to the other end of the main pipeline, a pump provided in the first circulation path between one end and the other end of the main pipeline and capable of sucking and pressurizing the slurry, a sub-pipeline which branches from the pump or branches from the main pipeline between the pump and the nozzle and extends to the inner space of the container and that forms a second circulation path of the slurry, a valve capable of switching distribution of the slurry to one or both of the first circulation path and the second circulation path, and a discharge port provided at a tip opposite to a branch end of the sub-pipeline and located below the nozzle in a vertical direction.

In one embodiment, it is preferable to have a sensor which detects a level of a liquid surface of the slurry in the container, and it is preferable that the valve can be switched based on level information of the slurry liquid surface from the sensor.

In one embodiment, it is preferable that the sub-pipeline branch from the main pipeline between the pump and the nozzle.

In one embodiment, it is preferable that one end of the main pipeline be connected to a bottom of the container, and the other end of the main pipeline extend from an upper portion of the container toward a bottom surface of the inner space.

In one embodiment, a lower side of the inner space of the container is preferably a conical reduced diameter portion having an inner bottom surface whose cross-sectional area decreases downward.

In one embodiment, an inclination angle of the inner bottom surface of the reduced diameter portion is preferably 25° to 50° with respect to the vertical direction.

In one embodiment, it is preferable that the tip of the sub-pipeline be disposed so that a slurry discharge direction from the discharge port swirls the slurry in a circumferential direction of the inner bottom surface of the container.

In one embodiment, it is preferable that one end of the main pipeline be connected to an apex position of the conical reduced diameter portion of the container.

In one embodiment, the nozzle is preferably used as a jet mixer, the jet mixer preferably has an inlet and an outlet of the slurry delivered from the pump, and a sucking port which takes the slurry in the container, and it is preferable that the slurry delivered from the pump to the inlet of the nozzle and the slurry taken from the sucking port be mixed, and a mixed slurry can be jetted from the outlet.

In one embodiment, it is preferable that a lower portion of the container include a delivery pipeline which delivers the slurry to the outside of the container.

In one embodiment, the slurry preferably contains a binder.

The present invention relates to, in another embodiment, a slurry stirring method in which while a slurry containing particles and a solvent is stored in a container, the slurry is sucked and pressurized by a pump to be returned into the container through a nozzle and circulated. The slurry stirring method includes: preparing, as circulation paths of the slurry, a first circulation path including a main pipeline which connects the container and a nozzle immersed in the slurry via the pump and a second circulation path including a sub-pipeline which branches from the pump or branches from the main pipeline between the pump and the nozzle and has at its tip a discharge port whose position in a vertical direction is located below the nozzle; storing the slurry in the container; circulating and stirring the slurry through the first circulation path; delivering the slurry to the outside of the container through a delivery pipeline connected to the container; detecting a level of a liquid surface of the slurry in the container with a sensor; and switching the circulation path of the slurry based on level information of the liquid surface of the slurry from the sensor. When the liquid surface of the slurry is detected to be above a set level, one or both of the first circulation path and the second circulation path are selected, and the slurry is jetted or discharged from one or both of the nozzle and the discharge port corresponding to the selected circulation path and stirred. When the liquid surface of the slurry is detected to be the same as or lower than the set level, the second circulation path is selected, and the slurry is discharged from the discharge port of the sub-pipeline and stirred.

In another embodiment, it is preferable that a liquid surface level of the slurry that switches the circulation path of the slurry be set above the nozzle.

In another embodiment, the nozzle is preferably used as a jet mixer, the jet mixer preferably has an inlet and an outlet of the slurry delivered from the pump, and a sucking port which takes the slurry in the container, and it is preferable to mix the slurry delivered from the pump to the inlet of the nozzle and the slurry taken from the sucking port and jet a mixed slurry from the outlet.

In another embodiment, a flow rate of the slurry in the circulation path is preferably 3.3 to 8.3 per second.

Effect of the Invention

According to the present invention, it is possible to provide a slurry storage and stirring device which can sufficiently flow the slurry by a simple means even if an amount of the slurry in a slurry storage container varies, and has excellent stirring properties and in which uneven dispersion of the particles into the solvent is unlikely to occur while suppressing foaming of the slurry, and a slurry stirring method.

MODE FOR CARRYING OUT THE INVENTION

Hereinafter, a slurry storage and stirring device and a slurry stirring method according to an embodiment of the present invention will be specifically described, but the present invention is not limited thereto, and various modifications can be naturally made without departing from the spirit of the present invention.

Figure 1:
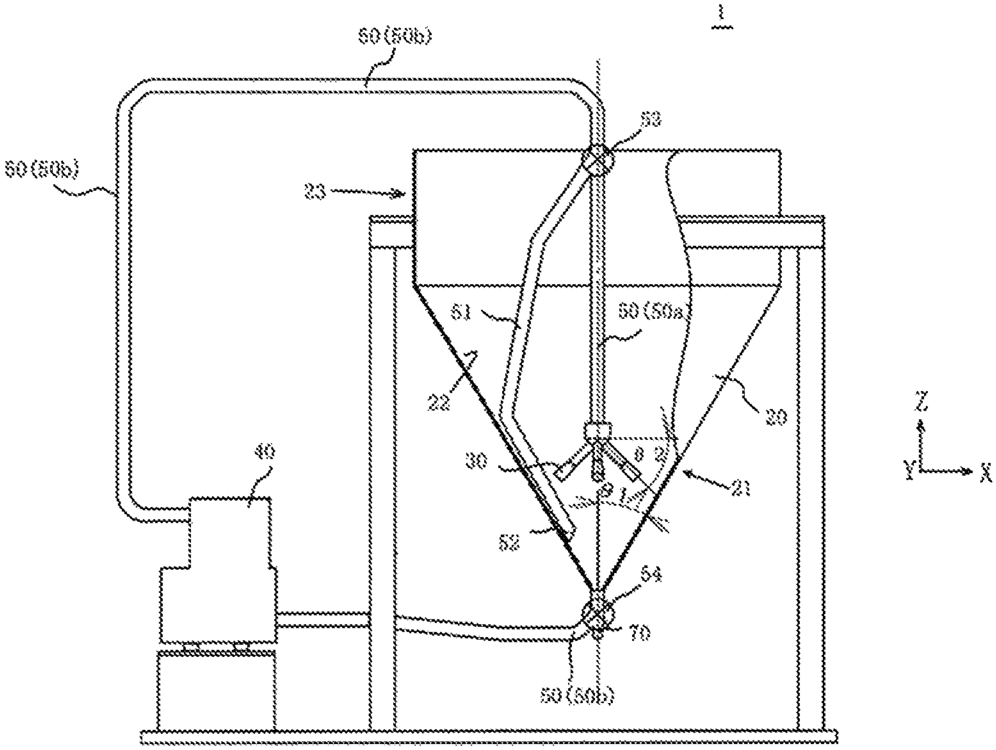
FIG. 1 is a diagram showing a structure of a slurry storage and stirring device according to an embodiment of the present invention.
Figure 2:
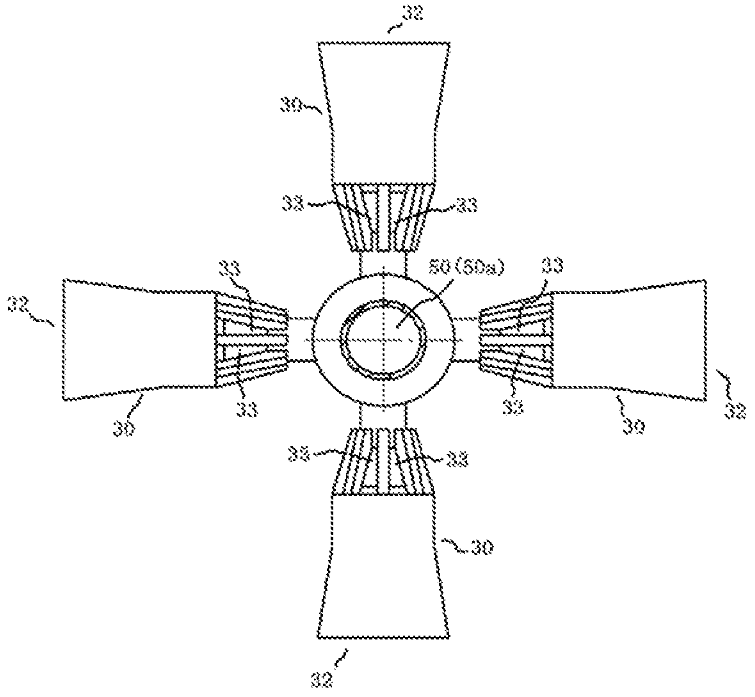
FIG. 2 is a diagram showing an arrangement example of nozzles in the slurry storage and stirring device according to the embodiment of the present invention.
Figure 3:
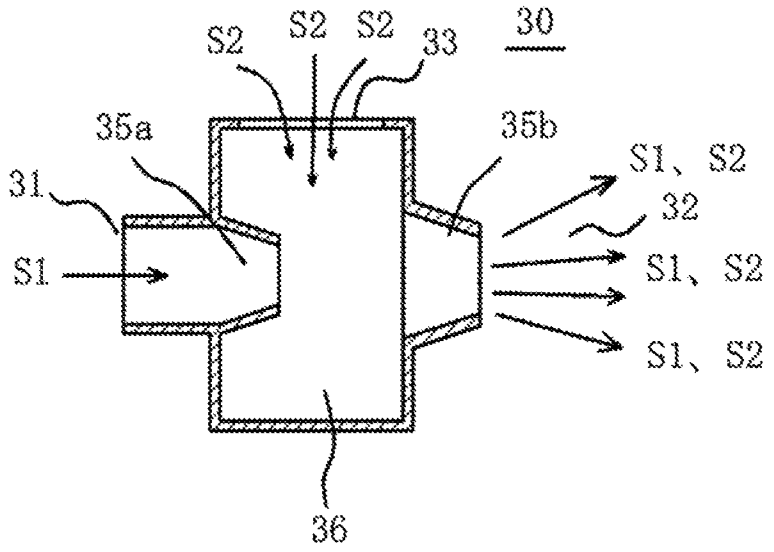
FIG. 3 is a diagram for explaining a structure of the nozzle used in the slurry storage and stirring device according to the embodiment of the present invention.
Figure 4:
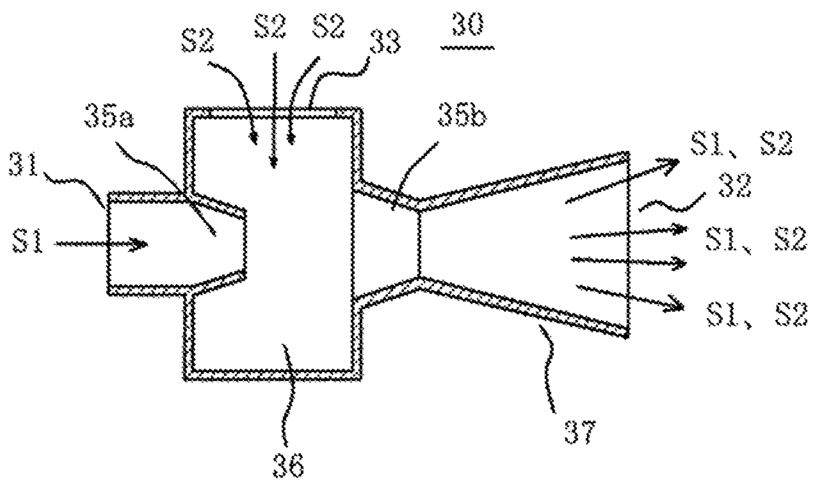
FIG. 4 is a diagram for explaining the structure of the nozzle used in the slurry storage and stirring device according to the embodiment of the present invention.
Figure 5:
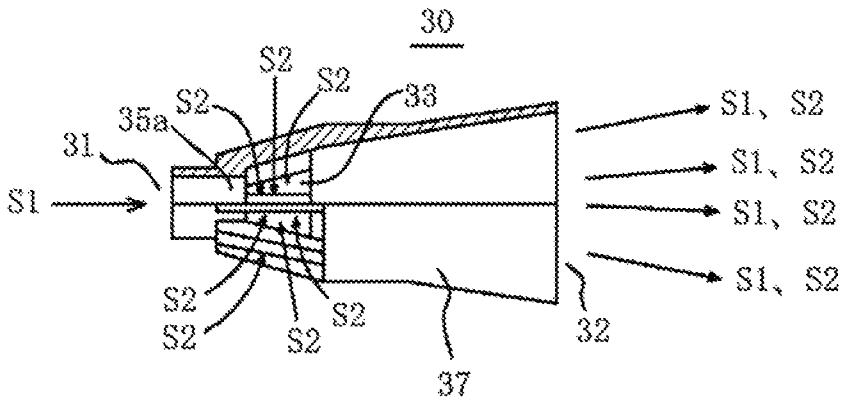
FIG. 5 is a diagram for explaining another structure of the nozzle used in the slurry storage and stirring device according to the embodiment of the present invention.
Figure 6:
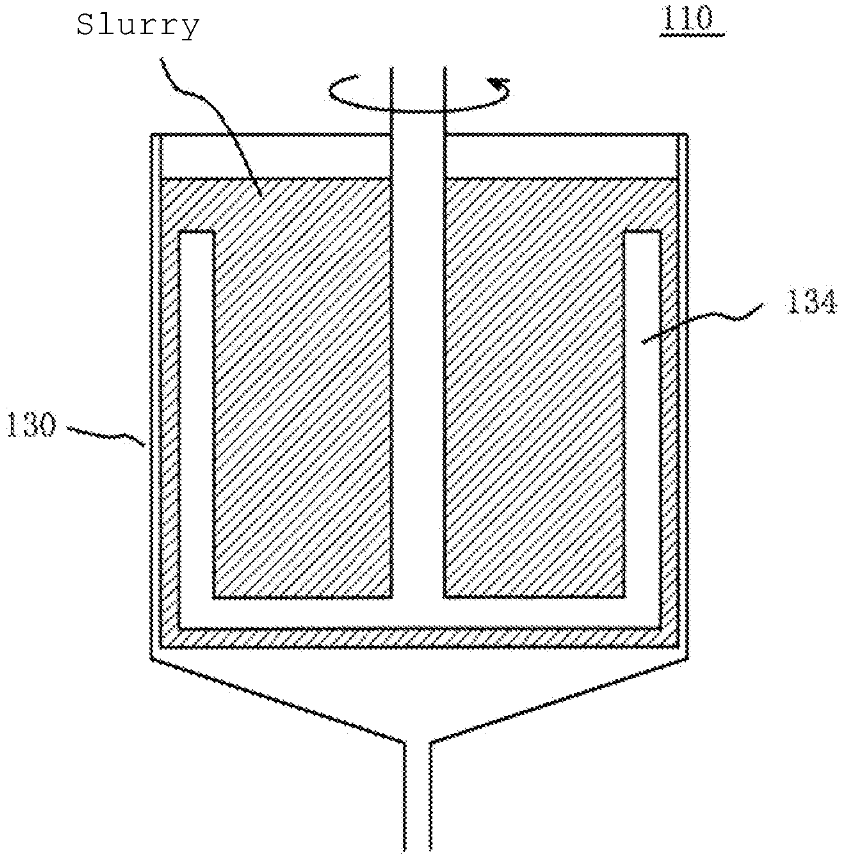
FIG. 6 is a diagram for explaining a configuration of a conventional slurry storage and stirring device.

FIG. 1 is a diagram showing a structure of the slurry storage and stirring device according to the embodiment of the present invention. FIG. 1 shows a state where a container is cut partially for easy understanding of an internal structure of the container. FIG. 2 shows an arrangement example of nozzles in the slurry storage and stirring device according to the embodiment of the present invention. FIGS. 3, 4, and 5 show a structure of the nozzle used in the slurry storage and stirring device according to the embodiment of the present invention. The arrows in the drawings schematically show flow of a slurry generated in the container. Parts having the same function are denoted by the same reference numerals in the drawings. Regarding the drawings used for the description, an essential part is mainly described so that the gist of the invention can be easily understood, and the detail is appropriately omitted.

A slurry storage and stirring device 1 shown in FIG. 1 includes a container 20 capable of storing a slurry (not shown) containing particles and a solvent, a nozzle 30 having an outlet of the slurry, a pump 40 which sucks and pressurizes the slurry in the container 20 and delivers the slurry to the nozzle 30, pipelines 50 and 51 forming a circulation path of the slurry, a valve 53 which switches the circulation path, and a sensor (not shown) which detects a height of a slurry liquid surface in the container.

The slurry is circulated through a first circulation path including the pipeline 50 having one end connected to the container 20 and the other end, which extends to an inner space of the container 20 and in which the nozzle 30 is attached to a tip of the other end, and a second circulation path including the pipeline 51 branching from the pipeline 50 between the pump 40 and the nozzle 30 and extending to the inner space of the container 20. The pump 40 is provided so as to be able to suck and pressurize the slurry in the first circulation path between one end and the other end of the pipeline 50, sucks the slurry from the container 20, and pressurizes the slurry to return the slurry to the container 20. In the illustrated example, the branched pipeline 51 is a single pipeline; however, the branched pipeline 51 may further branch into a plurality of routes. Hereinafter, the pipeline 50 may be referred to as the main pipeline, and the pipeline 51 may be referred to as the sub-pipeline. Although FIG. 1 shows a mode in which the sub-pipeline 51 branches from the main pipeline 50 between the pump 40 and the nozzle 30, the present invention is not limited to this mode, and the sub-pipeline 51 may branch from the pump 40 and extend into the inner space of the container 20. In this case, the valve 53 which switches the circulation path may be provided in the pump.

A sensor detects a level of the liquid surface of the slurry in the container 20, and the valve 53 switches the circulation path of the slurry based on level information from the sensor. The valve 53 of the present embodiment is provided on a branch end side of the sub-pipeline 51, and can switch distribution of the slurry to one or both of the first circulation path and the second circulation path. In the present embodiment, as the circulation path of the slurry, the first circulation path is selected when the liquid surface of the slurry is above the nozzle 30. The slurry is jetted from the nozzle 30 immersed in the slurry in the container 20, and the slurry in the container 20 is stirred.

On the other hand, when the liquid surface of the slurry is the same as or below the nozzle 30, the second circulation path is selected. The sub-pipeline 51 includes, at a tip opposite to the branch end from the main pipeline 50, a discharge port 52 whose vertical position is below the nozzle 30. By discharging the slurry from the discharge port 52, the slurry remaining in a lower portion of the container 20 is stirred.

As the circulation path of the slurry, not only the first circulation path but also the second circulation path can be adopted when the liquid surface of the slurry is above the nozzle 30. The jetting of the slurry from the nozzle 30 in the first circulation path and the discharge of the slurry from the discharge port 52 in the second circulation path can efficiently generate a turbulent flow of the slurry and uniformize the slurry.

In the container 20 shown in FIG. 1, an upper side in a Z direction (vertical direction) is a cylindrical portion 23 having a cylindrical shape, and a lower side is a conical reduced diameter portion 21 whose cross-sectional area gradually decreases downward. The container 20 has an inner bottom surface 22 having an inclination angle θ1. The inclination angle θ1 is preferably 25° to 50° with respect to the vertical direction in consideration of stirring the slurry. The inclination angle θ1 of the inner bottom surface 22 is more preferably 25° to 40°. The container 20 has a support leg for locating the lower portion of the container 20 above an installation surface and vertically arranging the container at an installation site.

The container 20 may have a double structure including an inner cylinder for storing the slurry and an outer cylinder provided on the outer circumference thereof. By controlling a liquid temperature of a heat medium such as water or oil and circulating the heat medium between the inner cylinder and the outer cylinder, the temperature of the stored slurry can be adjusted, and evaporation of the solvent can be prevented. A material of a portion of the container 20 which comes into contact with the slurry is preferably formed of a metallic material such as stainless steel from the viewpoint of wear resistance and corrosion resistance.

At least a portion of a ceiling of the container 20 preferably has a lid structure that can be opened and closed so as to supply the solvent and powder forming the slurry. The ceiling is provided with a pipeline 50*a* which is connected to the pump 40 provided in an outer space and is a portion of the main pipeline 50 extending in the vertical direction from the upper side toward the inner bottom surface on the lower side in the inner space of the container 20. In the illustrated example, although a pipeline 50*b* which is a portion of the main pipeline 50 is introduced into the inner space of the container 20 from a substantially central portion of the ceiling, the introduction position may be on the upper side of the container 20 and is not particularly limited. One end of the pipeline 50*b* is connected to the vicinity of a bottom of the container 20, and the pipeline 50*a* in the inner space of the container 20 and the pipeline 50*b* in the outer space of the container 20 are connected via the pump 40 and form the circulation path of the slurry.

The sub-pipeline 51 branches from the main pipeline 50 between the pump 40 and the nozzle 30 in the main pipeline 50, and the valve 53 for switching distribution of the slurry is attached. As the valve 53, for example, a pinch valve or the like can be used. The pinch valve is interposed in each of the main pipeline 50 and the sub-pipeline 51, and a flow passage is opened and closed based on the level information from the sensor, so that the circulation path of the slurry can be switched.

In the illustrated example, the pipeline 50*b* is connected to an apex position of the conical inner bottom surface, which is the lower portion of the container 20. Since the slurry is sucked and circulated from there, even if particles precipitate, the slurry flows along the inner bottom surface 22 of the container 20, and it is possible to prevent the slurry from precipitating at the bottom.

A delivery pipeline 70 is connected to the container 20 via a valve 54 provided in the pipeline 50*b*. The slurry is delivered to the outside of the container through the delivery pipeline 70. It is preferable that the delivery pipeline 70 be connected to another pump so as to communicate with a device such as a molding machine or a dryer in a subsequent step.

A plurality of the nozzles 30 are connected to a lower end of the pipeline 50*a* in the container 20. The nozzle 30 is disposed such that the outlet side is inclined downward from an XY plane (horizontal direction) and the outlet of the nozzle 30 faces the inner bottom surface 22 of the container 20. The outlet of the nozzle 30 and the inner bottom surface 22 of the container 20 are brought close to each other, and the slurry jetted from the nozzle 30 is allowed to collide with the inner bottom surface 22 of the container 20 to generate a turbulent flow, so that the effect of stirring the slurry can be enhanced.

The nozzle 30 is preferably attached to the pipeline 50*a* such that an angle θ2 with respect to the horizontal direction is 15° to 45°. The angle θ2 of the nozzle 30 and the inclination angle θ1 of the inner bottom surface 22 of the container 20 are appropriately set, the flow of the slurry along the inner bottom surface 22 of the container 20 is formed, and the slurry is swirled in an up-down direction and a circumferential direction and stirred, so that separation of the slurry into particles and the solvent is suppressed, thereby maintaining high dispersibility and supplying the slurry to a subsequent step. If the angles θ1 and θ2 are outside predetermined angle ranges, the energy of the slurry jetted from the nozzle 30 may be attenuated, and the flow of the slurry may become insufficient, resulting in non-uniform stirring. The angle θ2 of the nozzle 30 is more preferably 20° to 40°.

The number of the nozzles 30 is not particularly limited, but is preferably a number that can be attached to the pipeline 50*a* of the nozzle 30, and is preferably appropriately set in consideration of a capacity (slurry amount) of the container 20, a balance between a flow rate of the slurry from the pump 40 and a flow rate of the slurry capable of being jetted from the nozzle 30, and the state of stirring. For example, the number of the nozzles 30 is preferably three or more, and more preferably four or more.

FIG. 2 is a diagram (inclination angle is not reflected) of a nozzle portion of the slurry storage and stirring device shown in FIG. 1 as seen from vertically above the container 20. The pipeline 50*a* is disposed on a central axis of the container 20, and the four nozzles 30 are radially attached to the lower end of the pipeline 50*a*. Each of the nozzles is connected to the pipeline 50*a* at equal intervals at an angle of 90° when viewed from the vertical direction. By providing the plurality of nozzles 30, the slurry is jetted in a plurality of directions in the container 20. As a result, a stirring region is divided, and energy required for stirring by the nozzle 30 is shared, so that it is advantageous to provide a plurality of nozzles rather than one nozzle. The intervals of the nozzles 30 may be unevenly arranged according to a state of stirring the slurry in the container 20. The nozzle 30 may rotate with the pipeline 50*a* as a rotation axis.

FIGS. 3 to 5 show examples of the structure of the nozzle used in the slurry storage and stirring device.

Generally, a flow path which reduces a cross-sectional area of the flow path and accelerates flow is called a nozzle, and a flow path which decelerates the flow is called a diffuser. The nozzle 30 in the present invention also includes a structure in which a nozzle portion and a diffuser portion are combined.

For example, FIGS. 3 to 5 show a jet mixer as the nozzle 30 including the nozzle portion and the diffuser portion. Each jet mixer has a structure in which the nozzle portion and the diffuser portion are arranged in series through an open space, has a sucking port 33 for taking the slurry in the container between an inlet 31 and an outlet 32, and has a structure of mixing the slurry from the inlet 31 and the slurry from the sucking port 33 and capable of jetting the slurry from the outlet 32. The nozzle 30 as described above is called an ejector or a jet nozzle and is commercially available. In the following description, in the internal structure of the nozzle 30, the nozzle (acceleration) portion is referred to as an acceleration flow path, and the diffuser (deceleration) portion is referred to as a deceleration flow path.

The nozzle 30 shown in FIG. 3 is a jet mixer having, as the nozzle portion in which the cross-sectional area of the flow path decreases in a flow travel direction, a first acceleration flow path 35*a* between the inlet 31 and the sucking port 33 and a second acceleration flow path 35*b* between the sucking port 33 and the outlet 32.

The first acceleration flow path 35*a* and the second acceleration flow path 35*b* are continuous via a suction chamber 36, and the suction chamber 36 is a partially open space connected to the outside through the sucking port 33. A slurry S1 from the inlet 31 is jetted from the first acceleration flow path 35*a* toward the second acceleration flow path 35*b* having an opening wider than its cross-sectional area. The flow of the slurry S1 causes a pressure drop in the suction chamber 36, and a slurry S2 around the nozzle 30 is drawn into the suction chamber 36. The slurry S1 flows into the second acceleration flow path 35*b* while mixing with the sucked slurry S2, and is jetted at high speed from the outlet 32. The slurry in the container 20 is stirred by the flow of the slurry generated by the jetting from the outlet 32 of the nozzle 30 and the suction into the sucking port 33.

The nozzle 30 shown in FIG. 4 is a jet mixer having substantially the same configuration as the nozzle 30 of FIG. 3, but has a deceleration flow path 37 in which the cross-sectional area of the flow path increases at a tip of the second acceleration flow path 35*b*. While the flow rates of the slurries S1 and S2 flowing into the deceleration flow path 37 decrease, their energy acts to increase the pressure, and thus the nozzle 30 thus configured is suitable for use in stirring a high concentration of slurry and a slurry in a case of using oil as the solvent.

FIG. 5 shows another mode of the jet mixer. The deceleration flow path 37 is held at a tip of the first acceleration flow path 35*a* via a plurality of connecting portions. A space between the first acceleration flow path 35*a* and the deceleration flow path 37 is an open space opened except the connecting portion, and serves as the sucking port 33.

The deceleration flow path 37 has an opening wider than the first acceleration flow path 35*a*, and when the slurry S1 from the inlet 31 is jetted from the first acceleration flow path 35*a* toward the deceleration flow path 37, the resulting pressure drop causes the slurry S2 around the nozzle 30 to be drawn into the deceleration flow path 37. The slurries S1 and S2 are mixed while advancing in the deceleration flow path 37, and the mixed slurry is jetted from the outlet 32 at a total rate of the flow rate of the slurry S1 flowing into the sucking port 33 and the flow rate of the slurry S2 drawn from the sucking port 33. A liquid amount of the mixed slurry jetted from the outlet 32 is 3 to 6 times that of the slurry S1.

The solvent used for the slurry in the present invention is not particularly limited, such as general water, alcohols such as isopropyl alcohol, and oils such as mineral oils, synthetic oils, and vegetable oils, and since the nozzle 30 described with reference to FIGS. 3 to 5 can increase a stirring force by increasing swirling energy of the slurry in the container 20, the nozzle 30 is suitable for a case of handling a slurry having a slurry concentration of more than 60% by mass, or stirring a slurry using a highly viscous oil as the solvent.

The powder is also not particularly limited and may be formed of, for example, a ceramic powder such as $Al_2O_3$ or $ZrO_2$, a magnetic powder such as soft ferrite or hard ferrite, a magnetic powder such as SmCo magnet or NdFeB magnet, a magnetic powder of a crystalline or amorphous alloy of Fe—Si alloy, Fe—Cr alloy, Fe—Cr—Si alloy, Fe—Al alloy, Fe—Al—Si alloy, Fe—Al—Cr alloy, Fe—Al—Cr—Si alloy, Fe—Ni alloy, or Fe-M-B alloy (M is at least one of Si, Cr, Al and Ni), or metal particles having a large specific gravity, such as a non-magnetic metal powder such as stainless steel or super steel.

The powder is obtained by, for example, a pulverizing method or an atomizing method such as gas atomizing or water atomizing, and is a powder having an average particle diameter defined by a median diameter d50 of about 0.5 μm to 200 μm. According to the present invention, it is possible to obtain a uniform slurry having high dispersibility even with a fine powder having an average particle diameter of 10 μm or less.

The type of binder is not particularly limited, but various organic binders such as polyethylene, polyvinyl alcohol, and acrylic resin can be used.

The pump 40 sucks the slurry in the container 20 and returns the slurry into the container 20, and it is preferable to use a diaphragm pump or a centrifugal pump. It is preferable to circulate the slurry at a flow volume of 200 to 500 liters/min by the pump 40 and a flow rate in the circulation path of 3.3 to 8.3 m/sec.

Next, an example of a slurry stirring method by the slurry storage and stirring device 1 will be described. First, a solvent such as water is supplied into the container 20 from the ceiling side of the container 20. The first circulation path is selected by the valve 53, the pump 40 provided near the container 20 is operated, the solvent stored in the container 20 is sucked through the pipeline 50*b*, delivered into the container 20 through the pipeline 50*a* and the nozzle 30, and circulated. The solvent may be supplied until the solvent becomes in a state capable of being circulated using the first circulation path of the main pipeline 50, and it is preferable to supply the solvent to such an extent that the nozzle 30 is immersed.

While circulating the solvent using the first circulation path, a powder or binder is charged from the ceiling side of the container 20, and, if necessary, the solvent is further added, so that it is possible to obtain a slurry in which particles are uniformly dispersed in the solvent at a predetermined concentration. The slurry is stored in the container 20 while maintaining the stirring state. It is also possible to temporarily switch the circulation path of the slurry to the second circulation path and interrupt stirring using the first circulation path.

When operations such as molding and drying, which are subsequent steps, are performed, the closed valve 54 is opened toward the delivery pipeline 70 while maintaining the state of circulating and stirring the slurry in the container 20. A portion of the slurry passes through the delivery pipeline 70 to be delivered to a device such as a molding machine or a dryer in a subsequent step. A branch portion may be provided in the middle of a connecting pipeline between the slurry storage and stirring device 1 and the device in the subsequent step. For example, the pipeline may be branched into a plurality of routes at the branch portion and connected to a plurality of devices, or a route for returning the slurry into the container 20 may be selectable when it is desired to temporarily stop the supply of the slurry to the devices in the subsequent step.

The liquid surface of the slurry in the container 20 falls as the slurry is delivered to the device in the subsequent step through the delivery pipeline 70. When the liquid surface of the slurry falls below the nozzle 30, an atmospheric gas such as air in the container 20 is entrained from the sucking port 33, so that the slurry foams. In order to prevent this, it is preferable to detect the level information of the slurry liquid surface with the sensor and stop the jetting of the slurry from the nozzle 30 before the liquid surface of the slurry falls below the nozzle 30.

On the other hand, when the sensor detects that the liquid surface of the slurry is above the nozzle 30, the first circulation path may be selected, and the slurry may be jetted from the nozzle 30 corresponding to the first circulation path to maintain stirring. In this case, the slurry may be distributed to the second circulation path in addition to the first circulation path, and while the slurry may be jetted from the nozzle 30 and stirred, the slurry may be discharged from the discharge port 52 and stirred.

After it is detected that the liquid surface of the slurry is the same as the nozzle 30 (position spaced apart above from the nozzle by a predetermined distance), or is below the nozzle 30 and the stirring of the slurry by the nozzle 30 is stopped, the slurry remaining in the lower portion of the container 20 (hereinafter sometimes referred to as residual slurry) is preferably stirred by the slurry discharged from the discharge port 52 of the sub-pipeline 51 forming the second circulation path.

That is, the nozzle 30 having the outlet 32 of the slurry serves as first slurry stirring means, and the sub-pipeline 51 serves as second slurry stirring means. Even if the amount of slurry varies and the slurry liquid surface falls below the nozzle 30, as long as the position in the vertical direction of the discharge port 52 at a lower end of the sub-pipeline 51 is below the outlet 32 of the nozzle 30 and closer to the bottom of the container 20, the residual slurry in the container 20 can be stirred by the slurry pressurized by the pump 40 and discharged from the discharge port 52 of the sub-pipeline 51. It is also preferable to adjust a discharge direction of the slurry from the sub-pipeline 51 so that the slurry is swirled in the circumferential direction of the inner bottom surface 22 of the container 20. Even if the jetting of the slurry from the nozzle 30 is stopped, the slurry discharged from the discharge port 52 can maintain the stirring of the slurry in the container 20 and prevent the particles from precipitating.

The switching between the first circulation path to the nozzle 30 and the second circulation path to the discharge port 52 may be performed by the valve 53 based on the information of the sensor which detects the level of the liquid surface of the slurry in the container 20. As a result, after the jetting of the slurry from the nozzle 30 is stopped, the circulation path of the slurry is quickly switched to maintain the stirring of the slurry in the container.

If the amount of the slurry stored and stirred in the container 20 is small, the slurry may be stirred using only the second circulation path.

Regarding the switching of the circulation path, although the mode has been described in which after the jetting of the slurry from the nozzle 30 in the first circulation path is stopped, the slurry is discharged from the discharge port 52 in the second circulation path, however, the present invention is not limited to this mode. Instead, while jetting the slurry from the nozzle 30 in the first circulation path, the slurry may be discharged from the discharge port 52 in the second circulation path, and thereafter the jetting of the slurry from the nozzle 30 may be stopped.

EXAMPLES

A device having the same structure as the slurry storage and stirring device shown in FIG. 1 was produced. The container 20 was constituted of the cylindrical portion 23 and the reduced diameter portion 21, the diameter of the cylindrical portion 23 was φ1100 mm, and the conical reduced diameter portion 21 had an inclination angle θ1 of 30°. A height from a virtual apex that determines the inclination angle θ1 to the ceiling is about 1350 mm. The nozzle 30 is the commercially available nozzle shown in FIG. 5, and the material is SUS316 in consideration of wear resistance. The four nozzles 30 are attached to a tip of the pipeline 50*a* extending downward from the substantially central portion of the ceiling of the container 20 so as to be attached radially at an angle of 90° when viewed from the vertical direction and form an angle of 30° downward with respect to a plane (horizontal direction) orthogonal to the vertical direction. An interval between the outlet 32 of the nozzle 30 and the inner bottom surface 22 of the container 20 was set to about 90 mm, a connection position between the nozzle 30 and the pipeline 50*a* was set to about 450 mm from the virtual apex determining the inclination angle θ1 of the conical reduced diameter portion 21, the discharge port 52 of the sub-pipeline 51 was set to about 150 mm from the virtual apex, and the discharge direction of the slurry was adjusted such that the slurry was swirled in the circumferential direction of the inner bottom surface 22 of the container 20.

Ion-exchanged water was used as a solvent, and a Fe—Al—Cr alloy magnetic powder with an average particle diameter d50 of 10 μm obtained by an atomizing method was used as a powder. The ion-exchanged water was stored in the container 20, and while circulating the water by the pump 40, a total amount of water in the container 20 was set to 150 liters, and 1000 kg of Fe—Al—Cr alloy magnetic powder and 100 kg of PVA (POVAL PVA-205 from Kuraray Co., Ltd.; solid content 10%) as a binder were charged to prepare a slurry having a concentration of 80% by mass.

The pump 40 circulated the slurry in the container 20 at 300 liters/min using the first circulation path, and the slurry was delivered at a speed of 5 m/sec. The slurry in the container 20 was stirred by the turbulent flow formed by the slurry jetted from the outlet 32 of the nozzle 30 and the slurry taken into the sucking port 33 of the nozzle 30.

Although the slurry storage and stirring device 1 was continuously operated for three days, particles and water were not separated in the container 20, and neither precipitation nor accumulation of the particles on the lower portion of the container 20 was observed.

The slurry was stirred while withdrawing the slurry in the container 20 from the delivery pipeline 70 at the bottom of the container 20. The second circulation path was selected by switching the circulation path of the slurry until the liquid surface of the slurry reached an upper end of the nozzle 30, and while the jetting of the slurry from the nozzle 30 was stopped, the slurry was discharged from the discharge port 52 of the sub-pipeline 51. Even after the circulation path was switched, the stirring of the residual slurry was continued, and neither precipitation nor accumulation of the magnetic powder on the lower portion of the container 20 was recognized.

The delivery pipeline 70 was connected to a spray dryer which was a wind dryer. The slurry was sprayed by the spray dryer and instantaneously dried with hot wind having a temperature adjusted to 240° C. to collect a granule made into a granular form from a lower portion of the device. The resultant granule had a small difference in bulk density, and a uniform granule could be obtained.

For comparison, even if the liquid surface of the slurry fell below the nozzle 30, the circulation path of the slurry was not switched and was kept to the first circulation path, and the jetting of the slurry from the nozzle 30 was continued. Entrainment of air with the nozzle 30 caused remarkable foaming of the slurry.

DESCRIPTION OF REFERENCE SIGNS

1 slurry storage and stirring device
20 container
21 reduced diameter portion
22 inner bottom surface
23 cylindrical portion
30 nozzle
31 inlet
32 outlet
33 sucking port
35*a* first acceleration flow path
35*b* second acceleration flow path
36 suction chamber
37 deceleration flow path
40 pump
50, 50*a*, 50*b* pipeline
51 pipeline
52 discharge port
53, 54 valve
70 delivery pipeline
S1, S2 slurry

The invention claimed is:

1. A slurry storage and stirring device comprising:
a container capable of storing a slurry containing particles and a solvent;
a main pipeline whose one end is connected to the container and the other end extends to an inner space of the container and toward a bottom surface of the inner space, forming a first circulation path of the slurry;
a nozzle attached to the other end of the main pipeline;
a pump which is provided in the first circulation path between one end and the other end of the main pipeline and sucks and pressurizes the slurry;
a sub-pipeline which branches from the pump or branches from the main pipeline between the pump and the nozzle and extends to the inner space of the container, forming a second circulation path of the slurry;
a valve which switches distribution of the slurry to one or both of the first circulation path and the second circulation path; and
a discharge port provided at a tip opposite to a branch end of the sub-pipeline and located below the nozzle in a vertical direction.

2. The slurry storage and stirring device according to claim 1, further comprising a sensor which detects a level of a liquid surface of the slurry in the container,
wherein the valve is switched based on level information of the liquid surface of the slurry from the sensor.

3. The slurry storage and stirring device according to claim 1, wherein the sub-pipeline branches from the main pipeline between the pump and the nozzle.

4. The slurry storage and stirring device according to claim 1, wherein one end of the main pipeline is connected to a bottom of the container, and the other end of the main pipeline extends from an upper portion of the container toward a bottom surface of the inner space.

5. The slurry storage and stirring device according to claim 1, wherein a lower side of the inner space of the container is a conical reduced diameter portion having an inner bottom surface whose cross-sectional area decreases downward.

6. The slurry storage and stirring device according to claim 5, wherein an inclination angle of the inner bottom surface of the reduced diameter portion is 25° to 50° with respect to the vertical direction.

7. The slurry storage and stirring device according to claim 5, wherein the tip of the sub-pipeline is disposed so that a slurry discharge direction from the discharge port swirls the slurry in a circumferential direction of the inner bottom surface of the container.

8. The slurry storage and stirring device according to claim 5, wherein one end of the main pipeline is connected to an apex position of the conical reduced diameter portion of the container.

9. The slurry storage and stirring device according to claim 1, wherein the nozzle is used as a jet mixer, the jet mixer has an inlet and an outlet of the slurry delivered from the pump, and a sucking port which takes the slurry in the container, the slurry delivered from the pump to the inlet of the nozzle and the slurry taken from the sucking port are mixed, and a mixed slurry is jetted from the outlet.

10. The slurry storage and stirring device according to claim 1, wherein a lower portion of the container includes a delivery pipeline that delivers the slurry to the outside of the container.

11. The slurry storage and stirring device according to claim 1, wherein the slurry contains a binder.

12. The slurry storage and stirring device according to claim 1, wherein an outlet of the nozzle and an inner bottom surface of the container are brought close to each other.

13. The slurry storage and stirring device according to claim 1, wherein the container has a ceiling, and the ceiling is provided with the main pipeline extending in a vertical direction toward an inner bottom surface on a lower side in the inner space of the container.

14. The slurry storage and stirring device according to claim 1, wherein a plurality of nozzles are attached to the other end of the main pipeline.

* * * * *